(12) United States Patent
Komatsu et al.

(10) Patent No.: US 8,154,231 B2
(45) Date of Patent: Apr. 10, 2012

(54) MOTOR CONTROLLER AND VEHICULAR STEERING SYSTEM USING SAID MOTOR CONTROLLER

(75) Inventors: Hayato Komatsu, Ama-gun (JP); Akira Tanizawa, Yao (JP); Masaya Segawa, Nara (JP); Yuji Kariatsumari, Yamatotakada (JP)

(73) Assignee: JTEKT Corporation, Osaka-shi (JP)

( * ) Notice: Subject to any disclaimer, the term of this patent is extended or adjusted under 35 U.S.C. 154(b) by 586 days.

(21) Appl. No.: 12/360,217

(22) Filed: Jan. 27, 2009

(65) Prior Publication Data
US 2009/0190903 A1    Jul. 30, 2009

(30) Foreign Application Priority Data
Jan. 30, 2008    (JP) .................................. 2008-019535

(51) Int. Cl.
*H02P 6/16*    (2006.01)
(52) U.S. Cl. ......... 318/400.06; 318/400.04; 318/400.01; 318/700
(58) Field of Classification Search ............. 318/400.06, 318/400.04, 400.01, 700
See application file for complete search history.

(56) References Cited

U.S. PATENT DOCUMENTS

| | | | | |
|---|---|---|---|---|
| 5,711,394 A | * | 1/1998 | Fujii et al. | 180/422 |
| 6,696,812 B2 | * | 2/2004 | Kaneko et al. | 318/700 |
| 6,781,333 B2 | * | 8/2004 | Koide et al. | 318/432 |

FOREIGN PATENT DOCUMENTS

| | | |
|---|---|---|
| JP | 2003-40119 | 2/2003 |
| JP | 2004-343963 | 12/2004 |

* cited by examiner

*Primary Examiner* — Walter Benson
*Assistant Examiner* — David Luo
(74) *Attorney, Agent, or Firm* — Oblon, Spivak, McClelland, Maier & Neustadt, L.L.P.

(57) ABSTRACT

A low speed region position estimating portion is designed to be suitable for when the motor is operating in a low speed region, and estimates a low speed estimated rotational position $\hat{\theta}_L$. A high speed region position estimating portion is designed to be suitable for when the motor is operating in a high speed region, and estimates a high speed estimated rotational position $\hat{\theta}_H$. A dividing portion obtains a divided estimated rotational position $\hat{\theta}_M$ by internally dividing the low speed estimated rotational position $\hat{\theta}_L$ and the high speed estimated rotational position $\hat{\theta}_H$. A rotation speed calculating portion obtains a rotation speed $\omega$ of a rotor based on an output signal from a steering sensor. The rotational position of the rotor is then obtained by selecting one of i) the low speed estimated rotational position $\hat{\theta}_L$, the high speed estimated rotational position $\hat{\theta}_H$, or the divided estimated rotational position $\hat{\theta}_M$, based on that rotation speed $\omega$.

11 Claims, 9 Drawing Sheets

MOTOR CONTROLLER AND VEHICULAR STEERING SYSTEM USING SAID MOTOR CONTROLLER

INCORPORATION BY REFERENCE

The disclosure of Japanese Patent Application No. 2008-019535 filed on Jan. 30, 2008, including the specification, drawings and abstract is incorporated herein by reference in its entirety.

BACKGROUND OF THE INVENTION

1. Field of the Invention

The invention relates to a motor controller for driving a brushless motor without using sensors, as well as to a vehicular steering system which uses that motor controller. A brushless motor is used as a source for generating steering force or steering assist force in an electric power steering system or other vehicular steering system, for example.

2. Description of the Related Art

A motor controller for controlling (i.e., driving) a brushless DC motor typically configured to control the supply of motor current according to output from a position sensor that detects the rotational position of a rotor. However, in addition to the position sensor not being very environmentally resistant, expensive position sensors and the wiring they require make it difficult to reduce costs as well as the size of the motor controller. Therefore, a sensorless drive system for driving a brushless DC motor without using a position sensor has been proposed. A sensorless drive system is a system that estimates the magnetic pole phase (i.e., the electrical angle of the rotor) by estimating the induced voltage generated by rotation of the rotor.

Figure 2A:
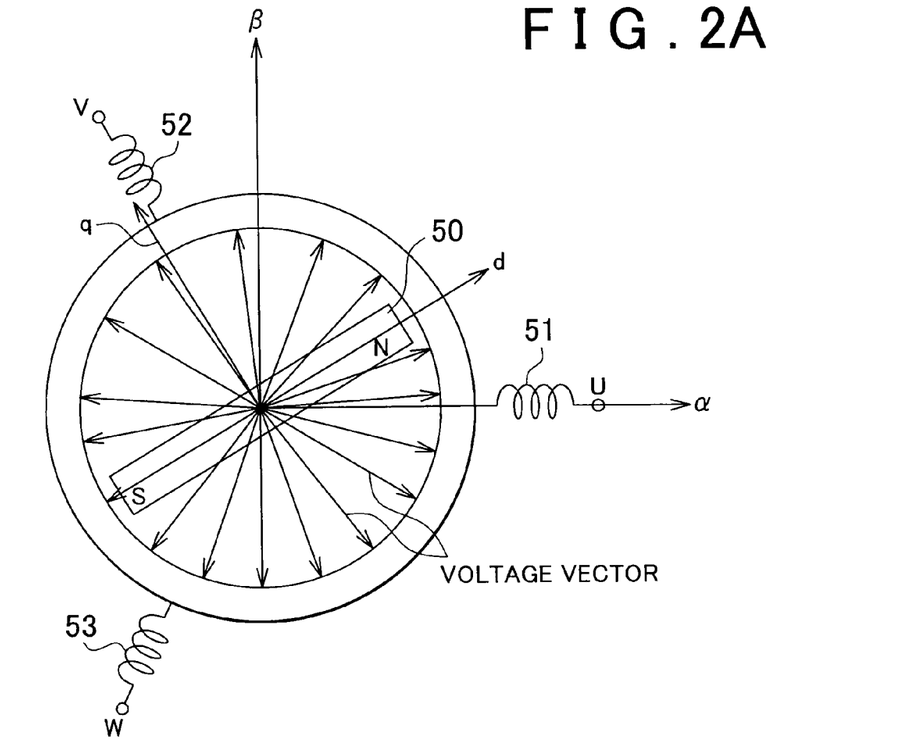
FIGS. 2A and 2B are diagrams illustrating the rotation of a high-frequency voltage vector and current vector.

When the rotor is stopped or rotating extremely slowly, the induced voltage is unable to be estimated so the magnetic pole phase is estimated by another method. More specifically, as shown in FIG. 2A, high-frequency probe voltage is applied to a U-phase stator winding 51, a V-phase stator winding 52, and a W-phase stator winding 53 to form a high-frequency voltage vector (of a consistent magnitude) that rotates in the direction of rotation of a rotor 50 around the origin of CCP coordinates which are fixed coordinates with their origin at the center of rotation of the rotor 50. The high-frequency voltage vector is a voltage vector that rotates at sufficiently high speed relative to the rotation speed of the rotor 50. As this high-frequency voltage vector is applied, a current flows through the U-phase stator winding 51, the V-phase stator winding 52, and the W-phase stator winding 53. The current vector that indicates the magnitude and direction of the current of these three phases on the $\alpha\beta$ coordinate system rotates about the origin.

Figure 2B:
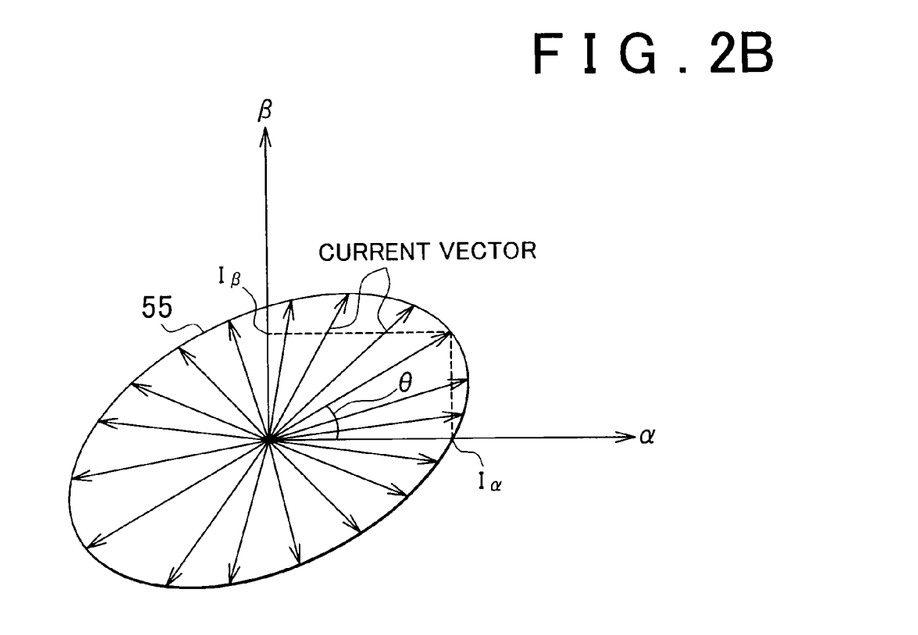

The inductance of the rotor 50 has a different value at a d-axis, which is a magnetic pole axis in the direction of magnetic flux, than it does at a q-axis which is orthogonal to the d-axis (i.e., an axis in the direction of torque). Therefore, the magnitude of the current vector becomes larger in the direction closer to the d-axis and smaller in the direction closer to the q-axis. As a result, the terminus of the current vector makes an elliptical trajectory 55 with the d-axis direction of the rotor 50 as the major axis on the $\alpha\beta$ coordinate system, as shown in FIG. 2B.

Figure 3A:
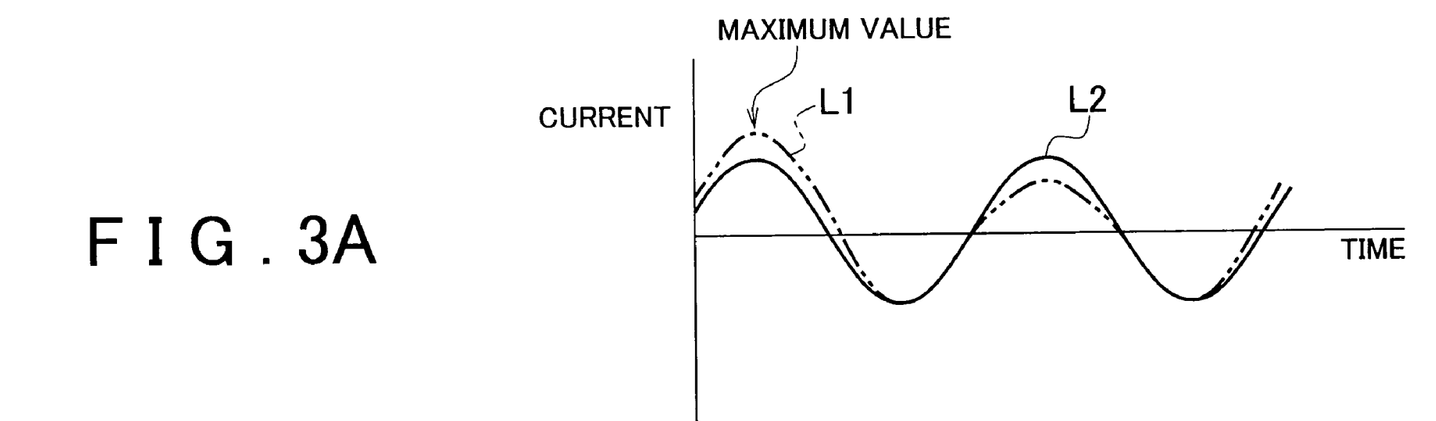
FIGS. 3A and 3B are graphs showing an operation for estimating a rotor phase angle by applying a high-frequency voltage vector.
Figure 3B:
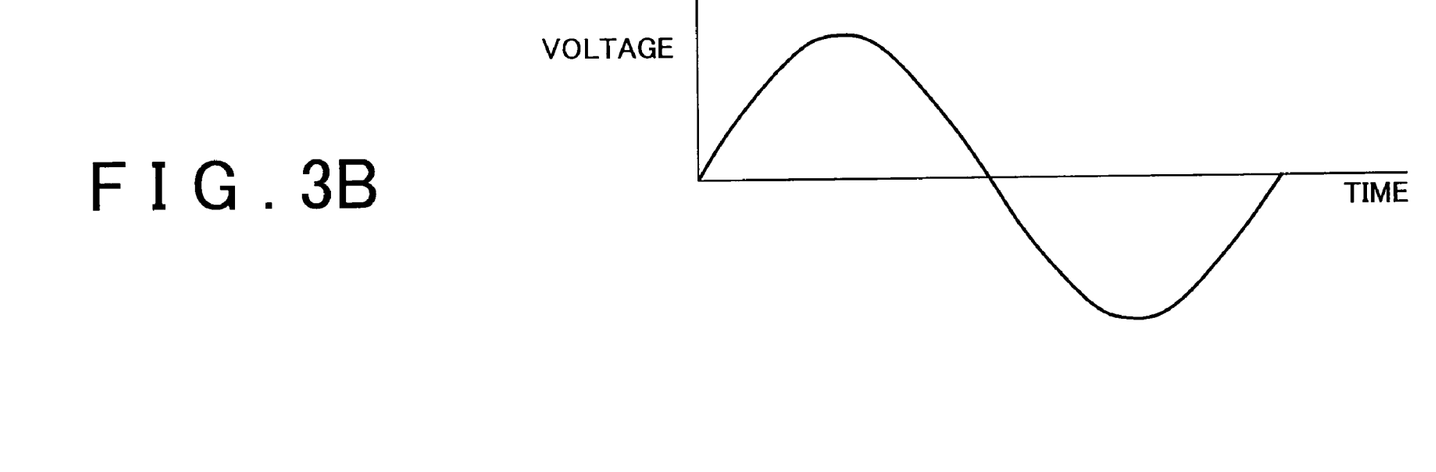

Therefore, the magnitude of the current vector has local maximum values in the directions of the N-pole and S-pole of the rotor 50. That is, the magnitude of the voltage vector changes as shown in FIG. 3B, while the magnitude of the current vector has two local maximum values in a single cycle, as shown in FIG. 3A. In this case, when the magnitude of the voltage vector is sufficiently large, the effect of magnetic saturation of the stator causes the inductance on the N-pole side of the rotor 50 to be smaller than the inductance on the S-pole side of the rotor 50, so the current vector in the direction of the N-pole assumes the highest value (see curve L1).

Therefore, a sufficiently large high-frequency voltage vector is applied to identify the local maximum current vector corresponding to the N-pole, after which a smaller high-frequency vector is applied, and the phase of the rotor 50 can then be estimated based on the local maximum value of the current vector. More specifically, the phase angle (electrical angle) $\theta$ of the rotor 50 can be obtained as $\theta = \text{Tan}^{-1}(I_\beta/I_\alpha)$ from an $\alpha$-axis component $I_\alpha$ and a $\beta$-axis component $I_\beta$ of the current vector when it is at the maximum value.

Meanwhile, Japanese Patent Application Publication No. 2004-343963 (JP-A-2004-343963) describes a method for estimating the rotation angle of a rotor using induced voltage. However, the position estimating method which uses high-frequency probe voltage is not suitable for use in the high speed region where the rotor position can be estimated using induced voltage because efficiency may decrease as a result of the high-frequency probe voltage being applied, which may adversely affect the control of the motor.

SUMMARY OF THE INVENTION

Thus, it is conceivable to perform a low speed region position estimating process for estimating the rotor position using high-frequency probe voltage when the rotor is stopped or rotating extremely slowly, and perform a high speed region position estimating process for estimating the rotor position using induced voltage in the high speed region. To do this, it is possible to calculate the rotor rotation speed by temporally differentiating the estimated rotor position, and switch between the low speed region position estimating process and the high speed region position estimating process depending on this calculated rotor rotation speed.

However, with a structure in which the rotor rotation speed is obtained based on the estimated rotor position, impulse noise and the like adversely affects the accuracy of the estimated rotor position, which in turn reduces the accuracy of the rotor rotation speed. Therefore, there may be erroneous switching between the low speed region position estimating process and the high speed region position estimating process, which may cause a temporary decrease in the position estimating accuracy.

Therefore, this invention provides a motor controller which can appropriately use low speed region position estimation and high speed region position estimation depending on the rotor rotation speed, and as a result, accurately calculate the rotor position and thus improve the accuracy with which the motor is controlled.

The invention also provides a vehicular steering system which can appropriately use low speed region position estimation and high speed region position estimation depending on the rotor rotation speed, and as a result, accurately control a motor that applies torque for steering and also improves the steering feel.

A first aspect of the invention relates to a motor controller that controls a motor provided with a rotor and a stator opposing the rotor. This motor controller includes a rotation speed detecting portion that detects the rotation speed of the rotor or a member that rotates together with the rotor; a low speed region position estimating portion which is designed to be suitable for a predetermined low speed region and estimates the rotational position of the rotor; a high speed region position estimating portion which is designed to be suitable for a predetermined high speed region and estimates the rotational position of the rotor; and a rotational position calculating portion which obtains the rotational position of the rotor based on i) the rotation speed detected by the rotation speed detecting portion, ii) the rotational position of the rotor estimated by the low speed region position estimating portion, and iii) the rotational position of the rotor estimated by the high speed region position estimating portion.

According to this structure, the rotation speed of the rotor or a rotating member that rotates together with the rotor (hereinafter simply referred to as the "rotating speed of the rotor or the like") is detected by the rotation speed detecting portion. That is, instead of obtaining the rotor rotation speed by a calculation using the rotational position of the rotor obtained by estimation, the rotation speed of the rotor or the like is detected. Then the rotational position of the rotor can be obtained using the detected rotation speed of the rotor or the like and the rotational position of the rotor estimated by both the low speed region position estimating portion and the high speed region position estimating portion. Accordingly, the rotation speed of the rotor or the like will not be affected even if there is estimation error in the rotational position of the rotor estimated by the low speed region position estimating portion or the high speed region position estimating portion. Therefore, the estimation results from the low speed region position estimating portion and the estimation results from the high speed region position estimating portion can be used appropriately depending on the rotation speed of the rotor or the like so the accuracy of the rotational position of the rotor that is obtained by the rotational position calculating portion can be improved.

Incidentally, the low speed region position estimating portion may estimate the rotational position of the motor based on the motor current detected by a motor current detecting portion. Also, the high speed region position estimating portion may estimate the rotational position of the motor based on the motor current detected by a motor current detecting portion and the motor voltage specified by a motor voltage command portion. For example, the induced voltage of the motor can be estimated based on the motor current and motor command voltage and the rotational position of the motor can be estimated based on this estimated induced voltage.

In the first aspect, the rotational position calculating portion may include a selecting portion that selects, according to the detected rotation speed, one of i) the rotational position of the rotor estimated by the low speed region position estimating portion or ii) the rotational position of the rotor estimated by the high speed region position estimating portion. According to this structure, the calculation results of the low speed region position estimating portion and the high speed region position estimating portion can be appropriately selected according to the rotation speed of the rotor or the like detected by the rotation speed detecting portion, and any difference in the estimated position will not affect this selection. As a result, the accuracy with which the rotational position of the rotor is calculated can be increased.

Incidentally, instead of simply switching between the calculation results of the low speed region position estimating portion and the high speed region position estimating portion, an appropriate rotational position may be estimated by combining the two calculation results. This makes it possible to suppress or prevent a discontinuation in the obtained rotational position, which in turn improves the stability of control when switching between the low speed region position estimation and the high speed region position estimation.

More specifically, the rotational position calculating portion may also include a dividing portion that obtains a divided rotational position by internally dividing i) the low speed rotational position obtained by the low speed region position estimating portion and ii) the high speed rotational position obtained by the high speed region position estimating portion in a medium speed region which is between the low speed region and a high speed region, according to the rotation speed obtained by the rotation speed detecting portion.

In the structure described above, the motor controller may also include a rotation speed estimating portion that estimates the rotation speed of the rotor based on i) the rotational position of the rotor calculated by the rotational position calculating portion or ii) the rotational position of the rotor estimated by the high speed region position estimating portion; a comparing portion that compares a rotation speed difference between the estimated rotation speed and the detected rotation speed with a speed difference threshold value; and a position correcting portion that corrects the rotational position obtained by the rotational position calculating portion, based on the detected rotation speed when the rotation speed difference is larger than the speed difference threshold value.

According to this structure, the estimated rotor rotation speed is obtained based on the rotation speed of the rotor calculated by the rotational position calculating portion or the rotational position of the rotor estimated by the high speed region position estimating portion. Then a rotation speed difference between this estimated rotor rotation speed and the detected rotation speed detected by the rotation speed detecting portion is obtained. A larger rotation speed difference is thought to indicate a large amount of error in the estimated rotor rotational position. Therefore, the rotation speed difference is compared to a speed difference threshold value and if this rotation speed difference is greater than the speed difference threshold value, the rotational position obtained by the rotational position calculating portion is corrected based on the detected rotation speed. As a result, the error in the estimated position can be reduced further. In particular, a difference between the estimated rotational position and the actual rotational position of the rotor tends to occur when there is a sudden change in speed or during high speed rotation, and this difference may cause torque pulsation. Therefore, with this structure, the estimated rotational position is corrected when the rotation speed difference is large, thereby minimizing torque pulsation.

For example, the rotation speed detecting portion may detect the rotation speed every predetermined sampling cycle, and the rotational position calculating portion may calculate the rotational position of the rotor every sampling cycle. In this case, the position correcting portion adds the product of the sampling cycle multiplied by the rotation speed detected by the rotation speed detecting portion to the last value calculated by the rotational position calculating portion, and the result of that addition (i.e., the sum) may be used as the current calculated value.

A second aspect of the invention relates to a vehicular steering system that transmits torque generated by a motor to a steering mechanism. This vehicular steering system includes a steering sensor that detects a steering angle; a vehicle speed sensor that detects a speed of a vehicle; and the motor controller of the first aspect that controls the motor. The rotation speed detecting portion obtains the rotation speed using the detected steering angle; and the rotational position calculating portion obtains the rotational position of the rotor based on i) the detected speed of the vehicle, ii) the detected rotation speed, iii) the rotational position of the rotor estimated by the low speed region position estimating portion, and iv) the rotational position of the rotor estimated by the high speed region position estimating portion.

According to this structure, the rotation speed detecting portion obtains the rotation speed of the rotor or the like using the steering sensor provided in the vehicular steering system so there is no need to provide special rotation speed detecting portion. For example, in this case, the rotation speed detecting portion may also obtain the rotation speed of the steering shaft by temporally differentiating the steering angle detected by the steering angle sensor. The thus obtained rotation speed does not use the estimated rotational position but instead uses the steering angle detected by the steering sensor and so is therefore not affected by error in the estimated rotational position.

Also, in this structure, the rotational position of the rotor is obtained considering the speed of the vehicle obtained by the vehicle speed sensor. For example, when the rotor rotation speed is in the medium or low speed region, the accuracy of the estimated rotor position may be lower than it is when the rotor is operating in the high speed region. Accordingly, in the medium and low speed regions, motor control performance may not be very high so the torque applied to the steering mechanism may become unstable. Therefore, the rotational position of the rotor may also be obtained considering the speed of the vehicle detected by the vehicle speed sensor.

In the second aspect, the rotational position calculating portion may obtain the rotational position of the rotor using the rotational position of the rotor estimated by the low speed region position estimating portion when the detected rotation speed is in a low speed region which includes values equal to or less than a first threshold value, obtain the rotational position of the rotor using both the rotational position of the rotor estimated by the low speed region position estimating portion and the rotational position of the rotor estimated by the high speed region position estimating portion when the detected rotation speed is in a medium speed region which includes values greater than the first threshold value and equal to or less than a second threshold value which is greater than the first threshold value, and obtain the rotational position of the rotor using the rotational position of the rotor estimated by the high speed region position estimating portion when the detected rotation speed is in the high speed region which includes values greater than the second threshold value.

In the second aspect, the rotational position calculating portion may obtain the rotational position of the rotor according to the above process when the detected speed of the vehicle is zero.

Meanwhile, the vehicular steering system may further include a current command value generating portion that sets a current command value for driving the motor based on the detected speed of the vehicle and the detected rotation speed. In the vehicular steering system, the current command value generating portion may set the current command value to zero to stop driving the motor when the detected speed of the vehicle is not zero and the detected rotation speed is in the low speed region. The rotational position calculating portion may obtain the rotational position of the rotor using the rotational position of the rotor estimated by the high speed region position estimating portion when the detected speed of the vehicle is not zero and the detected rotation speed is in the medium speed region or in the high speed region.

If the speed of the vehicle is zero, it does not really matter if the torque generated by the motor is somewhat unstable, but because the steering load is large, it is preferable that the torque generated by the motor be actively transmitted to the steering mechanism. Therefore, when the rotation speed of the rotor or the like is in the low speed region, the rotational position of the rotor is obtained using the rotational position of the rotor estimated by the low speed region position estimating portion. Also, when the rotation speed of the rotor or the like is in the medium speed region, the rotational position of the rotor is obtained using the rotational position of the rotor estimated by both the low speed region position estimating portion and the high speed region position estimating portion. Furthermore, when the rotation speed of the rotor or the like is in the high speed region, the rotational position of the rotor is obtained using the rotational position of the rotor estimated by the high speed region position estimating portion. Steering or steering assist is performed by having the torque generated by driving the motor based on the rotational position of the rotor obtained in this way be transmitted to the steering mechanism.

On the other hand, if the speed of the vehicle is not zero and the rotation speed of the rotor or the like is in the medium or high speed region, the rotor rotation speed is obtained using the rotational position of the rotor estimated by the high speed region position estimating portion. Moreover, the motor stops being driven when the rotation speed of the rotor or the like is in the low speed region. As a result, when the vehicle is moving, the motor is controlled without using the rotor rotation speed estimated by the low speed region position estimating portion with which high accuracy is difficult to achieve. Therefore, the odd feeling that unstable torque is being transmitted to the steering mechanism can be reduced or eliminated, thus improving the steering feel.

In the vehicular steering system as described above, the current command value generating portion may reduce the current command value as the rotation speed decreases when the speed of the vehicle detected by the vehicle speed sensor is not zero, and the detected rotation speed is in the medium speed region. When the rotation speed of the rotor or the like is in the medium speed region, the accuracy with which the high speed region position estimating portion estimates the rotational position of the rotor decreases as the rotor rotation speed decreases. Therefore, when the vehicle is moving and the rotation speed of the rotor or the like is in the medium speed region, the current command value is reduced as the rotation speed decreases. As a result, an odd steering feel caused by unstable torque being generated by the motor can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
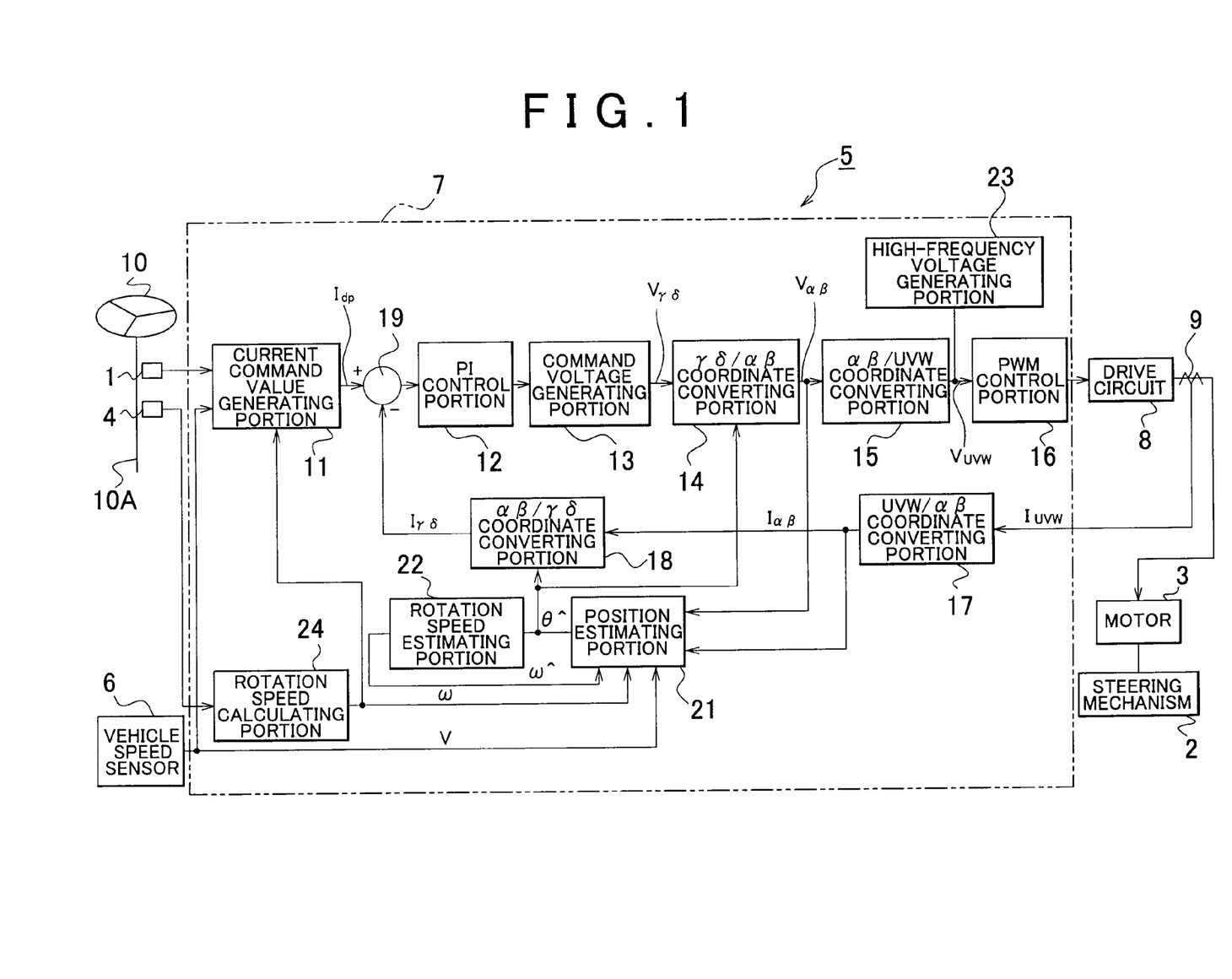
FIG. 1 is a block diagram of the electrical configuration of an electric power steering system to which a motor controller according to one example embodiment of the invention has been applied.

Example embodiments of the present invention will be described in greater detail below with reference to the accompanying drawings. FIG. 1 is a block diagram of the electrical configuration of an electric power steering system (i.e., one example of a vehicular steering system) to which a motor controller according to one example embodiment of the invention has been applied. This electric power steering system includes a torque sensor 1 that detects steering torque applied to a steering wheel 10 which serves as a steering member of a vehicle, a motor 3 (i.e., an electric motor) that applies steering assist force to a steering mechanism 2 of the vehicle, a steering sensor 4 that detects the steering angle which is the rotation angle of the steering wheel 10, a motor controller 5 that controls (i.e., drives) the motor 3, and a vehicle speed sensor 6 that detects the speed of the vehicle provided with the electric power steering system.

The motor controller 5 provides appropriate steering assist according to the steering state and vehicle speed by driving the motor 3 according to the steering torque detected by the torque sensor 1 and the vehicle speed detected by the vehicle speed sensor 6. The motor 3 in this example embodiment is a three-phase brushless DC motor, and includes a rotor 50 that functions as field system, and a U-phase stator winding 51, a V-phase stator winding 52, and a W-phase stator winding 53 which are provided on a stator opposite the rotor 50, as schematically shown in FIG. 2A. The motor 3 may be an inner-rotor type motor in which the stator is arranged opposing, and on the outside of, the rotor, or an outer-rotor type motor in which the stator is arranged opposing, and on the inside of, a cylindrical rotor.

The motor controller 5 includes a microcomputer 7, a drive circuit (i.e., inverter circuit) that is controlled by the microcomputer 7 and supplies power to the motor 3, and a current sensor 9 that detects current flowing through each phase stator winding of the motor 3. The microcomputer 7 includes a CPU and memory (i.e., ROM and RAM and the like) and functions as a plurality of function processing portions by executing predetermined programs. The plurality of function processing portions includes a current command value generating portion 11, a PI (proportional integral) control portion 12, a command voltage generating portion 13, a γδ/αβ coordinate converting portion 14, a αβ/UVW coordinate converting portion 15, a PWM control portion 16, a UVW/αβ coordinate converting portion 17, a αβ/γδ coordinate converting portion 18, a deviation calculating portion 19, a position estimating portion 21, a rotation speed estimating portion 22, a high-frequency voltage generating portion 23, and a rotation speed calculating portion 24.

The current command value generating portion 11 generates a command value $I_d^*$ of a d-axis current component in the direction of the magnetic pole of the rotor of the motor 3, and a command value $I_q^*$ of a q-axis current component orthogonal to the d-axis. Hereinafter when these are referred to together, they will collectively be referred to as "current command value $I_{dq}$". However, the dq plane of coordinates is a plane in the rotational direction of the rotor 50, and the d-axis and the q-axis define a rotating coordinate system that rotates together with the rotor 50 (see FIG. 2A).

When a current command value I* that indicates the amplitude of current (sinusoidal current) to be applied to the U, V, and W phases of the motor 3 is used, the d-axis current command value $I_d^*$ and the q-axis current command value $I_q^*$ can be expressed as shown in the following Expressions (1) and (2).

$$I_d^* = 0 \quad (1)$$

$$I_q^* = -\sqrt{\frac{3}{2}} I^* \quad (2)$$

Therefore, the current command value generating portion 11 generates a d-axis current command value $I_d^*$ of 0 and generates a q-axis current command value $I_q^*$ that corresponds to the steering torque detected by the torque sensor 1 and the vehicle speed detected by the vehicle speed sensor 6. More specifically, the q-axis current command value $I_q^*$ may also be generated using a map (i.e., a table) on which is stored q-axis current command values $I_q^*$ corresponding to the steering torque and the vehicle speed. Because the torque generated by the motor 3 corresponds to the motor current, the current command value $I_{dq}$ can also be referred to as the torque command value that specifies the torque to be generated by the motor.

The current sensor 9 detects a U-phase current $I_U$, a V-phase current $I_V$, and a W-phase current $I_W$ of the motor 3 (hereinafter when these are referred to together, they will collectively be referred to as "three-phase detection current $I_{UVW}$". This detection value is then applied to the UVW/αβ coordinate converting portion 17. The UVW/αβ coordinate converting portion 17 coordinate-converts the three-phase detection current $I_{UVW}$ into currents $I_\alpha$ and $I_\beta$ on a two-phase fixed coordinate system (hereinafter when these are referred to together, they will collectively be referred to as "two-phase detection current $I_{\alpha\beta}$). The two-phase fixed coordinate system is a fixed coordinate system that has an α-axis with its origin at the rotational center of the rotor 50, and a β-axis that is orthogonal to the α-axis (see FIGS. 2A and 2B). The coordinate-converted two-phase detection current $I_{\alpha\beta}$ is then applied to the αβ/γδ coordinate converting portion 18.

The αβ/γδ coordinate converting portion 18 coordinate-converts the two-phase detection current $I_{\alpha\beta}$ into currents $I_\gamma$ and $I_\delta$ (hereinafter when these are referred to together, they will collectively be referred to as "detection current $I_{\gamma\delta}$") on a rotating coordinate system (γ-δ) in accordance with a rotor rotational position θ̂ that is estimated by the position estimating portion 21 (hereinafter simply referred to as "estimated rotational position θ̂"). This rotating coordinate system (γ-δ) is a rotating coordinate system that is defined by a γ-axis in the direction of the magnetic poles of the rotor and an δ-axis orthogonal to the γ-axis, when the rotor 50 is in the estimated rotational position θ̂. When there is no error in the estimated rotational position θ̂ such that it is the same as the actual rotational position of the rotor, the dq rotating coordinate system and the γδ rotating coordinate system match up.

The detection current $I_{\gamma\delta}$ is then applied to the deviation calculating portion 19. This deviation calculating portion 19 calculates the deviation of the γ-axis current $I_\gamma$ with respect to the d-axis current command value $I_d^*$, as well as the deviation of the δ-axis current $I_δ$ with respect to the q-axis current command value $I_q^*$. These deviations are then sent to the PI control portion 12 where they are subjected to a PI calculation process. Then a γ-axis command voltage $V_γ^*$ and a δ-axis command voltage $V_δ^*$ (hereinafter when these are referred to together, they will collectively be referred to as "command voltage $V_{γδ}$") are generated by the command voltage generating portion 13 according to the calculation results and applied to the γδ/αβ coordinate converting portion 14.

The γδ/αβ coordinate converting portion 14 coordinate-converts the γ-axis command voltage $V_γ^*$ and the δ-axis command voltage $V_δ^*$ into an α-axis command voltage $V_α^*$ and a β-axis command voltage $V_β^*$ (hereinafter when these are referred to together, they will collectively be referred to as "two-phase command voltage $V_{αβ}$") which are command voltages on the two-phase fixed coordinate system. This two-phase command voltage $V_{αβ}$ is then applied to the αβ/UVW coordinate converting portion 15. The αβ/UVW coordinate converting portion 15 then converts the α-axis command voltage $V_α^*$ and a β-axis command voltage $V_β^*$ into command voltages of a three-phase fixed coordinate system, i.e., a U-phase command voltage $V_U^*$, a V-phase command voltage $V_V^*$, and a W-phase command voltage $V_W^*$ (hereinafter when these are referred to together, they will collectively be referred to as "three-phase command voltage $V_{UVW}$").

The PWM control portion 16 generates a drive signal of a duty ratio that is controlled according to the three-phase command voltages $V_U^*$, $V_V^*$, and $V_W^*$, and sends this drive signal to the drive circuit 8. As a result, voltage at a duty ratio corresponding to the U-phase command voltage $V_U^*$, the V-phase command voltage $V_V^*$, and the W-phase command voltage $V_W^*$ is applied to the corresponding phases of the motor 3. According to this kind of structure, when steering torque is applied to the steering wheel 10 which is linked to the steering mechanism 2, this steering torque is detected by the torque sensor 1. Then the current command value $I_{dq}$ corresponding to that detected steering torque and the vehicle speed detected by the vehicle speed sensor 6 is generated by the current command value generating portion 11. The deviation between the current command value $I_{dq}$ and the detection current $I_{γδ}$ is obtained by the deviation calculating portion 19 and a PI calculation is performed by the PI control portion 12 so that this deviation becomes zero. Then a command voltage $V_{γδ}$ corresponding to this calculation result is generated by the command voltage generating portion 13 and converted into a three-phase command voltage $V_{UVW}$ via the coordinate converting portions 14 and 15. Then the PWM control portion 16 operates the drive circuit 8 at a duty ratio corresponding to that three-phase command voltage $V_{UVW}$ to drive the motor 3 such that assist torque corresponding to the current command value $I_{dq}$ is applied to the steering mechanism 2. In this way, steering assist is performed according to the steering torque. The three-phase detection current $I_{UVW}$ detected by the current sensor 9 is then converted into a detection current $I_{γδ}$ expressed on the rotating coordinate system (γ-δ) so as to correspond to the current command value $I_{dq}$, via the coordinate converting portions 17 and 18, after which it is applied to the deviation calculating portion 19.

In order to perform coordinate conversion between the rotating coordinate system and the fixed coordinate system, a phase angle (electrical angle) θ indicative of the rotational position of the rotor 50 is necessary. The estimated rotational position θ^ indicative of this phase angle is generated by the position estimating portion 21 and then sent to the γδ/αβ coordinate converting portion 14 and the αβ/γδ coordinate converting portion 18. The high-frequency voltage generating portion 23 functions as probe voltage applying portion that applies a probe voltage to the motor 3 to estimate the phase angle θ of the rotor 50 when the rotor 50 is stopped or rotating extremely slowly (i.e., at 250 rpm or less). This high-frequency voltage generating portion 23 generates a voltage command value for applying, as the probe voltage, a high-frequency sinusoidal voltage (see FIG. 3B) of a sufficiently high frequency (such as 200 Hz) compared to the rated frequency of the motor 3 to the U-phase stator winding 51, the V-phase stator winding 52, and the W-phase stator winding 53 of the motor 3, and outputs this voltage command value to the PWM control portion 16. More specifically, a high-frequency voltage vector that rotates around the rotational center of the rotor 50 is applied by repeatedly energizing the V-W phase, the W-U phase, and the U-V phase sequentially by applying the high-frequency voltage at a duty ratio that will not cause the rotor 50 to rotate. This high-frequency voltage vector is a voltage vector of a constant magnitude that rotates at a constant speed about the origin of the an coordinates which are fixed coordinates with their origin at the rotational center of the rotor 50 (see FIG. 2A).

The high-frequency voltage generating portion 23 generates a command value for applying the high-frequency voltage (i.e., the probe voltage) described above when the rotor 50 is stopped or rotating extremely slowly, and sends this command value to the PWM control portion 16. When the rotor 50 is rotating fast enough (e.g., above 250 rpm), the high-frequency voltage generating portion 23 stops generating the high-frequency voltage command. The rotation speed estimating portion 22 generates an estimated rotation speed $ω^{\wedge}(=Δθ^{\wedge})$ of the rotor 50 by obtaining the difference $Δθ^{\wedge}$ of the estimated rotational position $θ^{\wedge}$ given for each predetermined control cycle T from the position estimating portion 21.

Figure 4:
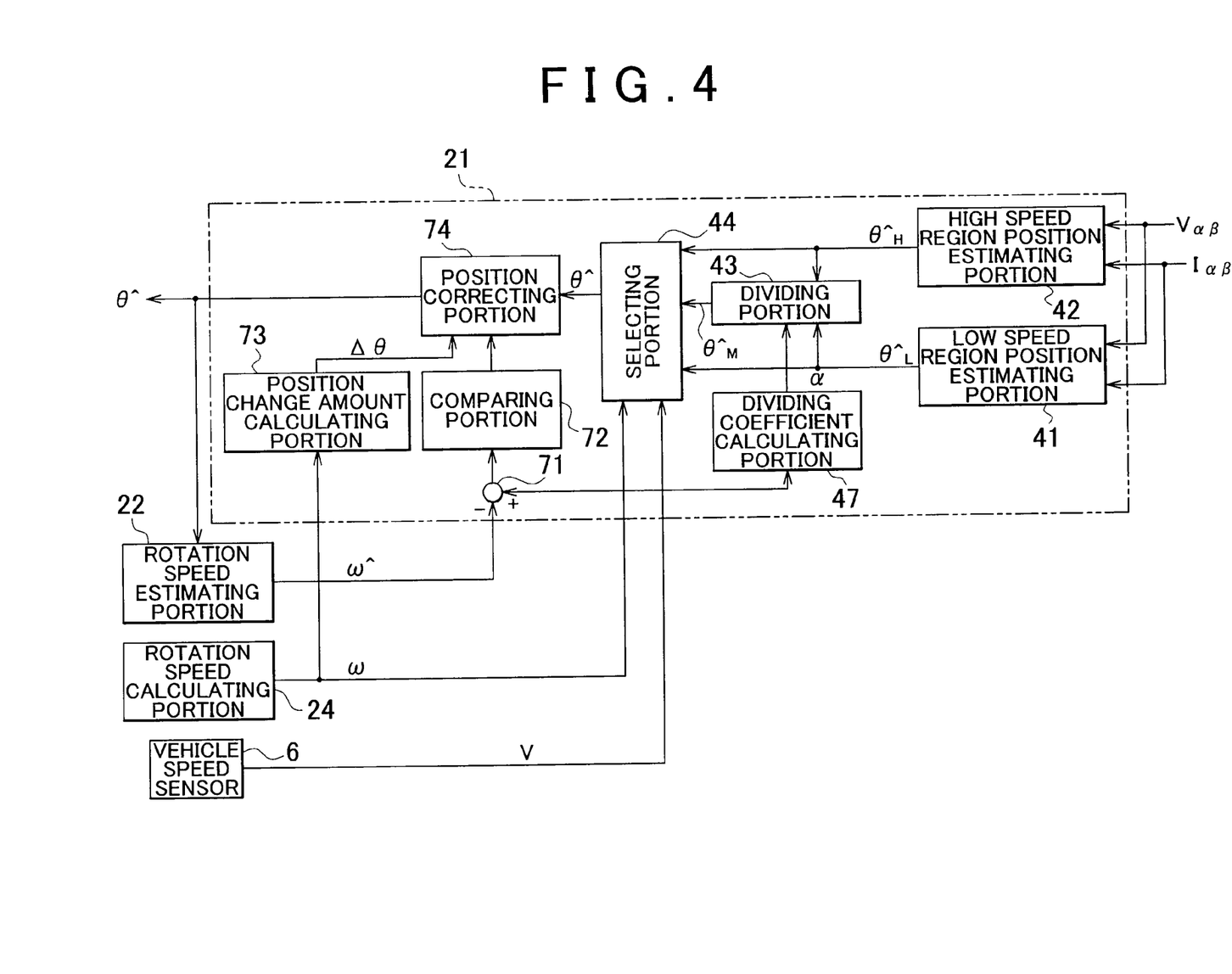
FIG. 4 is a block diagram of an example structure of a position estimating portion.

The rotation speed calculating portion 24 obtains the rotation speed (i.e., the steering angle speed) of a steering shaft 10A by temporally differentiating the steering angle detected by the steering angle sensor 4, and then converts it into the rotation speed ω of the motor 3. FIG. 4 is a block diagram of the structure of the position estimating portion 21. The position estimating portion 21 estimates the rotational position of the rotor 50 based on i) the motor current running through the motor 3 (i.e., the two-phase detection current $I_{αβ}$) in this example embodiment) and ii) the motor voltage applied to the motor 3 (i.e., the two-phase command voltage $V_{αβ}$ in this example embodiment). This position estimating portion 21 includes a low speed region position estimating portion 41, a high speed region position estimating portion 42, a dividing portion 43, a selecting portion 44, and a dividing coefficient calculating portion 47. Moreover, the position estimating portion 21 includes a rotation speed difference calculating portion 71, a comparing portion 72, a position change amount calculating portion 73, and a position correcting portion 74. The dividing portion 43 and the selecting portion 44 function as a rotational position calculating portion.

The low speed region position estimating portion 41 is designed to be suitable for estimating the position of the rotor 50 when the motor 3 is stopped or operating at an extremely slow speed (such as 0 to 100 rpm). This low speed region position estimating portion 41 estimates the rotational position of the rotor 50 based on the two-phase detection current $I_{αβ}$ output from the UVW/αβ coordinate converting portion 17 and the two-phase command voltage $V_{αβ}$ generated by the γδ/αβ coordinate converting portion 14. The high speed region position estimating portion 42 is designed to be suitable for estimating the position of the rotor 50 when the motor 3 is operating at high speeds (such as 200 rpm or higher). This high speed region position estimating portion 42 estimates the rotational position of the rotor 50 based on the two-phase detection current $I_{\alpha\beta}$ output from the UVW/αβ coordinate converting portion 17 and the two-phase command voltage $V_{\alpha\beta}$ generated by the γδ/αβ coordinate converting portion 14.

The dividing portion 43 internally divides the low speed estimated rotational position $\hat{\theta}_L$ obtained by the low speed region position estimating portion 41 and the high speed estimated rotational position $\hat{\theta}_H$ obtained by the high speed region position estimating portion 42 to obtain a divided estimated rotational position $\hat{\theta}_M$. A dividing coefficient α used in the dividing process of the dividing portion 43 is obtained by the dividing coefficient calculating portion 47. The selecting portion 44 selects one from among the low speed estimated rotational position $\hat{\theta}_L$, the high speed estimated rotational position $\hat{\theta}_H$, and the divided estimated rotational position $\hat{\theta}_M$, and outputs it as the estimated rotational position $\hat{\theta}$.

The rotation speed difference calculating portion 71 obtains the rotation speed difference $\Delta\omega(=\theta-\hat{\omega})$ between the rotation speed w obtained by the rotation speed calculating portion 24 and the estimated rotation speed $\hat{\omega}$ obtained by the rotation speed estimating portion 22. This rotation speed difference Δω is then compared with a speed difference threshold value by the comparing portion 72 and the comparison results are output. The position change amount calculating portion 73 obtains the position change amount Δθ by multiplying the control cycle T by the rotation speed ω obtained by the rotation speed calculating portion 24. The microcomputer 7 then reads the signal output from the current sensor 9 every control cycle T and the position estimating portion 21 estimates the rotational position of the rotor each control cycle T. As described above, the position change amount $\Delta\theta(=\omega\times T)$ is obtained by multiplying this control cycle T by the rotation speed ω. This position change amount Δθ corresponds to the amount of change in the rotor rotational position θ during the control cycle T.

When the rotation speed difference ω exceeds the speed difference threshold value based on the comparison results by the comparing portion 72, the position correcting portion 74 discards the estimated rotational position $\hat{\theta}$ selected by the selecting portion 44 in the current control cycle n, and obtains a corrected estimated rotational position $\hat{\theta}$ (n) by adding the position change amount Δθ to the estimated rotational position $\hat{\theta}$ (n−1) obtained in the last control cycle (n−1). That is, the corrected estimated rotational position $\hat{\theta}$ (n)=$\hat{\theta}$ (n−1)+Δθ. Making a correction in this way reduces torque pulsation caused by the estimated rotational position $\hat{\theta}$ being off from the actual rotational position, and thus improves the steering feel.

Figure 5:
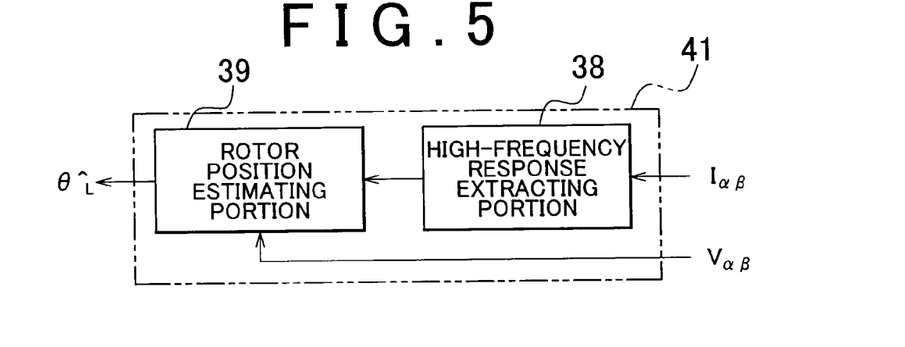
FIG. 5 is a block diagram of an example structure of a low speed region position estimating portion.

FIG. 5 is a block diagram of an example structure of the low speed region position estimating portion 41. The low speed region position estimating portion 41 includes a high-frequency response extracting portion 38 and a rotor position estimating portion 39. The high-frequency response extracting portion 38 receives the two-phase detection current $I_{\alpha\beta}$ output from the UVW/αβ coordinate converting portion 17. The high-frequency response extracting portion 38 is, for example, a high-pass filter which performs a filtering process to extract the high-frequency component corresponding to the frequency of the high-frequency voltage generated by the high-frequency voltage generating portion 23 from the signal output by the UVW/αβ coordinate converting portion 17. The rotor position estimating portion 39 estimates the rotor phase angle θ based on the high-frequency component extracted by the high-frequency response extracting portion 38. This estimating method is just like that described above with reference to FIGS. 2 and 3. The low speed estimated rotational position $\hat{\theta}_L$ is obtained according to Expression (3) below using the two-phase command voltages $V_\alpha^*$ and $V_\beta^*$ when the current vector is at maximum value, for example.

$$\hat{\theta}_L = \text{Tan}^{-1}(V_\beta^*/V_\alpha^*) \quad (3)$$

Figure 6:
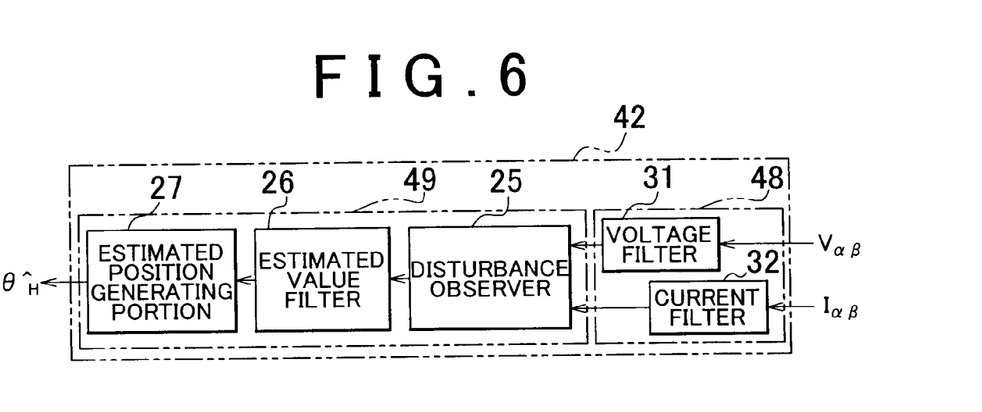
FIG. 6 is a block diagram of an example structure of a high speed region position estimating portion.

Of course, the low speed estimated rotational position $\hat{\theta}_L$ may also be obtained by $\hat{\theta}_L=\text{Tan}^{-1}(I_\beta/I_\alpha)$, as described above. FIG. 6 is a block diagram of an example structure of the high speed region position estimating portion 42. The high speed region position estimating portion 42 includes a signal processing portion 48 and a rotor position estimating portion 49. The signal processing portion 48 has a voltage filter 31 formed by a low-pass filter that filters out (i.e., removes) the high-frequency component from the two-phase command voltage $V_{\alpha\beta}$, and a current filter 32 formed of a low-pass filter that filters out (i.e., removes) the high-frequency component from the two-phase detection current $I_{\alpha\beta}$. The rotor position estimating portion 49 receives the two-phase command voltage $V_{\alpha\beta}$ and the two-phase detection current $I_{\alpha\beta}$ after signal processing (i.e., filtering) by the signal processing portion 48. The rotor position estimating portion 49 has a disturbance observer 25, an estimated value filter 26, and an estimated position generating portion 27. The disturbance observer 25 estimates, as disturbance, induced voltage of the motor 3 based on a motor model which is a mathematical model of the motor 3. The estimated value filter 26 is formed by a low-pass filter that filters out (i.e., removes) the high-frequency component from the estimated induced voltage output by the disturbance observer 25. The estimated position generating portion 27 generates the high speed estimated rotational position $\hat{\theta}_H$ of the rotor 50 based on the estimated induced voltage (i.e., the value after filtering) output by the estimated value filter 26. The disturbance observer 25 of the rotor position estimating portion 49 receives both the two-phase command voltage $V_{\alpha\beta}$ filtered by the voltage filter 31 of the signal processing portion 48 and the two-phase detection current $I_{\alpha\beta}$ filtered by the current filter 32.

Figure 7:
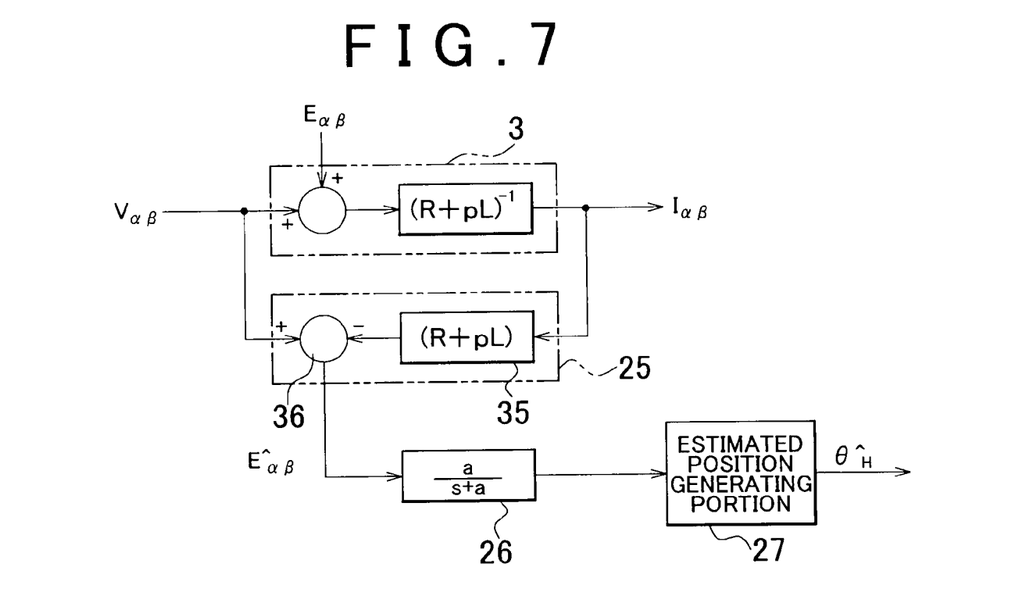
FIG. 7 is a block diagram of an example of a disturbance observer and the structure related thereto.

FIG. 7 is a block diagram of an example of the disturbance observer 25 and the structure related thereto. The motor model which is a mathematical model of the motor 3 can be expressed as $(R+pL)^{-1}$, for example, where R is the armature winding resistance, L is the αβ-axis inductance, and p is the differential operator. The two-phase command voltage $V_{\alpha\beta}$ and an induced voltage $E_{\alpha\beta}$ (i.e., a α-axis induced voltage $E_\alpha$ and a β-axis induced voltage $E_\beta$) can be applied to the motor 3.

The disturbance observer 25 may be formed by an inverse motor model (i.e., an inverse model of a motor model) 35 that receives the two-phase detection current $I_{\alpha\beta}$ and estimates the motor voltage, and a voltage deviation calculating portion 36 that obtains the deviation between the motor voltage estimated by the inverse motor model 35 and the two-phase command voltage $V_{\alpha\beta}$. The voltage deviation calculating portion 36 obtains the disturbance with respect to the two-phase command voltage $V_{\alpha\beta}$. As is evident from FIG. 7, this disturbance is an estimated value $\hat{E}_{\alpha\beta}$ (i.e., α-axis induced voltage estimated value $\hat{E}_\alpha$ and β-axis induced voltage estimated value $\hat{E}_\beta$ (hereinafter collectively be referred to as "estimated induced voltage $\hat{E}_{\alpha\beta}$")) that corresponds to the induced voltage $E_{\alpha\beta}$. The inverse motor model 35 may be expressed by R+pL, for example.

The estimated value filter 26 may be formed by a low-pass filter that may be expressed by a/(s+a), where a is a design parameter that determines the cutoff frequency ωc of the estimated value filter 26. The induced voltage $E_{\alpha\beta}$ can be expressed by Expression (4) below, where $K_E$ is an induced voltage constant, θ is the rotational position of the rotor, and ω is the rotor rotation speed.

$$E_{\alpha\beta} = \begin{bmatrix} E_a \\ E_b \end{bmatrix} = \begin{bmatrix} -K_E\omega\sin\theta \\ K_E\omega\cos\theta \end{bmatrix} \quad (4)$$

Therefore, when the estimated induced voltage $\hat{E}_{\alpha\beta}$ is obtained, the high speed estimated rotational position $\hat{\theta}_H$ can be obtained according to Expression (5) below. This calculation is performed by the estimated position generating portion 27.

$$\hat{\theta} = \tan^{-1}\frac{-\hat{E}_\alpha}{\hat{E}_\beta} \quad (5)$$

Figure 8:
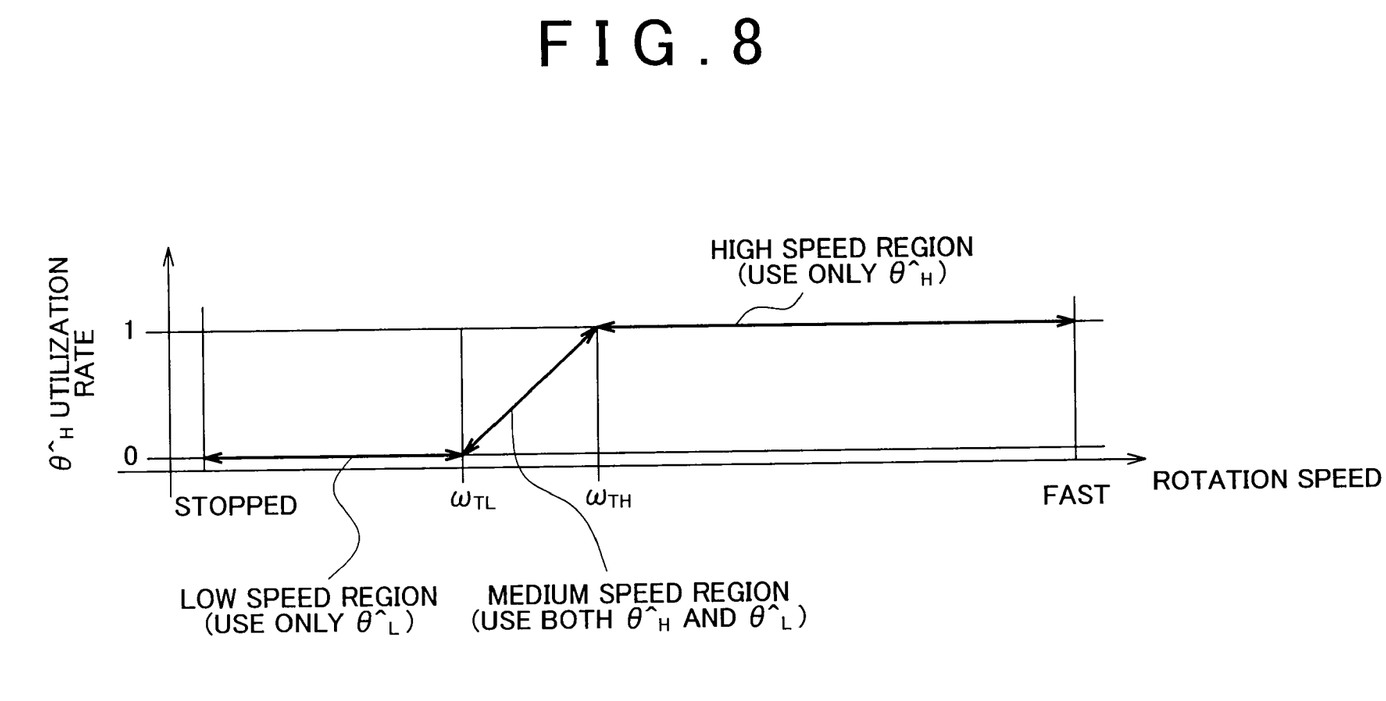
FIG. 8 is a graph showing a process performed by a dividing portion and a selecting portion.

FIG. 8 is a graph showing a process performed by the dividing portion 43 and the selecting portion 44. The horizontal axis represents the rotation speed of the motor 3 and the vertical axis represents the utilization rate of the high speed estimated rotational position $\hat{\theta}_H$ obtained by the high speed region position estimating portion 42. FIG. 8 shows an operation when the vehicle speed detected by the vehicle speed sensor 6 is zero, i.e., when the vehicle is stopped. The speed region of the rotation speed ω of the motor 3 (i.e., of the rotation speed ω calculated by the rotation speed calculating portion 24) is divided into three regions, i.e., a low speed region ($\omega \leq \omega_{TL}$) from a stopped state to a first threshold value $\omega_{TL}$, a medium speed ($\omega_{TL} < \omega \leq \omega_{TH}$) from the first threshold value $\omega_{TL}$ to a second threshold value $\omega_{TH}$ (where $\omega_{TH} > \omega_{TL}$), and a high speed region ($\omega_{TH} < \omega$) that exceeds the second threshold value $\omega_{TH}$.

The low speed region position estimating portion 41 is designed to be able to estimate the rotor rotational position within a predetermined accuracy range in the low and medium speed regions. Also, the high speed region position estimating portion 42 is designed to be able to estimate the rotor rotational position within a predetermined accuracy range in the medium and high speed regions. Therefore, in the medium speed region, both the low speed region position estimating portion 41 and the high speed region position estimating portion 42 are able to perform a calculation to estimate the rotor position. However, these calculation results are not always the same, rather, the calculation results usually differ.

In the low speed region, the selecting portion 44 selects the low speed estimated rotational position $\hat{\theta}_L$ obtained by the low speed region position estimating portion 41 and outputs it. Therefore, the utilization rate of the high speed estimated rotational position $\hat{\theta}_H$ in this case is zero. In the medium speed region, the selecting portion 44 selects the divided estimated rotational position $\hat{\theta}_M$ obtained by the dividing portion 43 and outputs it. In the high speed region, the selecting portion 44 selects the high speed estimated rotational position $\hat{\theta}_H$ obtained by the high speed region position estimating portion 42 and outputs it. Therefore, the utilization rate of the high speed estimation rotational position $\hat{\theta}_H$ in this case is 1 (100%).

Accordingly, the dividing portion 43 effectively functions in the medium speed region. The dividing portion 43 obtains the divided estimated rotational position $\hat{\theta}_M$ according to Expression (6) below.

$$\hat{\theta}_M = (1-\alpha) \times \hat{\theta}_L + \alpha \times \hat{\theta}_H \quad (6)$$

The dividing coefficient α is calculated by the dividing coefficient calculating portion 47 and indicates the utilization rate of the high speed estimated rotational position $\hat{\theta}_H$. The term (1−α) indicates the utilization rate of the low speed estimated rotational position $\hat{\theta}_L$. The dividing coefficient α can be variably set according to the rotation speed ω calculated by the rotation speed calculating portion 24. More specifically, the dividing coefficient α is calculated by the dividing coefficient calculating portion 47 to be larger as the rotation speed ω increases, and is output to the dividing portion 43. More specifically, the dividing coefficient α is set to change linearly within a range from 0 to 1 according to the rotation speed ω between the first threshold value $\omega_{TL}$ and the second threshold value $\omega_{TH}$, for example.

Figure 9:
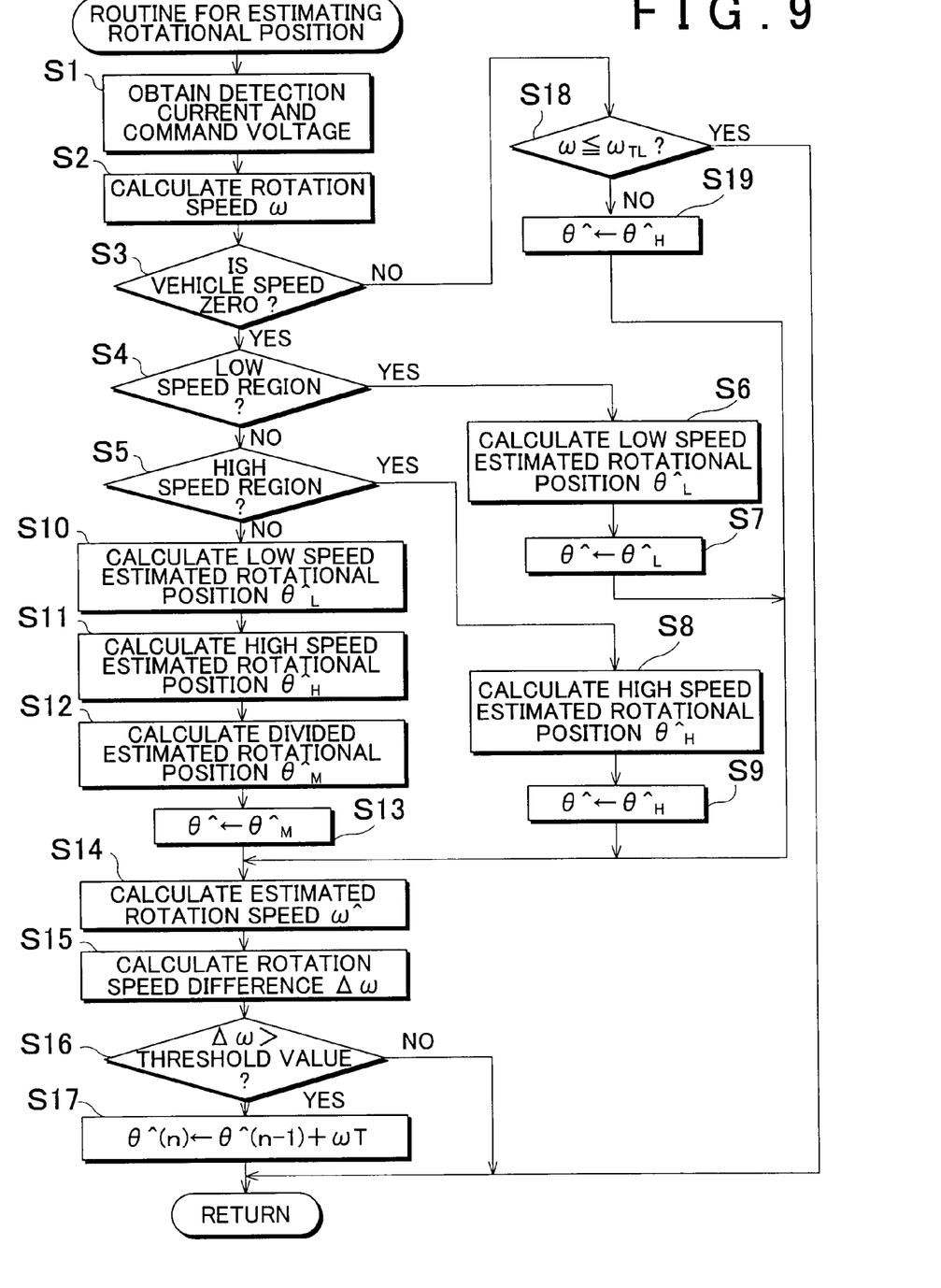
FIG. 9 is a flowchart of a routine for estimating the rotational position of the rotor.

FIG. 9 is a flowchart illustrating a routine according to which the microcomputer 7 estimates the rotational position of the rotor. This routine is repeatedly executed each control cycle mainly by the position estimating portion 21. The two-phase detection current $I_{\alpha\beta}$ calculated by the UVW/αβ coordinate converting portion 17 and the two-phase command voltage $V\alpha\beta$ calculated by the γδ/αβ coordinate converting portion 14 are received by the low speed region position estimating portion 41 and the high speed region position estimating portion 42 (step S1). Also, the rotation speed calculating portion 24 obtains the steering angle speed based on the difference between the steering angle detected by the steering sensor 4 in the current control cycle n and the steering angle detected by the steering angle sensor 4 in the last control cycle n−1, and then converts this steering angle speed into the rotation speed w of the rotor (step S2).

Then, it is determined whether the speed V of the vehicle detected by the vehicle speed sensor 6 is zero (step S3). If the speed V of the vehicle is zero (i.e., YES in step S3), i.e., if the vehicle is stopped, it is determined whether the rotation speed ω is in the low speed region, the medium speed region, or the high speed region (steps S4 and S5).

If the rotation speed ω is a value in the low speed region (i.e., $\omega \leq \omega_{TL}$) (i.e., YES in step S4), a low speed estimated rotational position $\hat{\theta}_L$ is obtained by the low speed region position estimating portion 41 (step S6) and this low speed estimated rotational position $\hat{\theta}_L$ is output from the selecting portion 44 as the estimated rotational position $\hat{\theta}$ (step S7). If the rotation speed ω is a value in the high speed region (i.e., $\omega > \omega_{TH}$) (i.e., YES in step S5), a high speed estimated rotational position $\hat{\theta}_H$ is obtained by the high speed region position estimating portion 42 (step S8) and this high speed estimated rotational position $\hat{\theta}_H$ is output from the selecting portion 44 as the estimated rotational position $\hat{\theta}$ (step S9).

If the rotation speed ω is a value in the medium speed region (i.e., $\omega_{TL} < \omega \leq \omega_{TH}$) (i.e., NO in step S5), a low speed estimated rotational position $\hat{\theta}_L$ is obtained by the low speed region position estimating portion 41 (step S10) and a high speed estimated rotational position $\hat{\theta}_H$ is obtained by the high speed region position estimating portion 42 (step S11). Then the internal dividing point between the low speed estimated rotational position $\hat{\theta}_L$ and the high speed estimated rotational position $\hat{\theta}_H$ is obtained by the dividing portion 43 which then calculates the divided estimated rotational position $\hat{\theta}_M$ (step S12). This divided estimated rotational position $\hat{\theta}_M$ is then output from the selecting portion 44 as the estimated rotational position $\hat{\theta}$ (step S13).

When the estimated rotational position $\hat{\theta}$ is output from the selecting portion 44 in this way, the rotation speed estimating portion 22 obtains the difference $\Delta\hat{\theta}(=\hat{\theta}(n)-\hat{\theta}(n-1))$ between the estimated rotational position $\hat{\theta}$ (n) obtained in the current control cycle n and the estimated rotational position $\hat{\theta}$ (n−1) obtained in the last control cycle n−1, and outputs this difference as the estimated rotational speed $\hat{\omega}$ (step S14). Next, the rotation speed difference calculating portion 71 obtains the rotation speed difference Δω between the estimated rotation speed ω̂ and the rotor rotation speed ω obtained by the rotation speed calculating portion 24 (step S15). Then the comparing portion 72 compares the rotation speed difference Δω with a speed difference threshold value (such as a value corresponding to 10 degrees when converted to a rotation angle difference ΔωT during one control cycle) (step S16). If the rotation speed difference Δω is equal to or less than the speed difference threshold value (i.e., NO in step S16), the estimated rotational position θ̂ (n) output from the selecting portion 44 in the current control cycle n is used as it is. If the rotation speed difference Δω exceeds the speed difference threshold value (i.e., YES in step S16), the estimated rotational position θ̂ (n) output by the selecting portion 44 in the current control cycle n is discarded and corrected to an estimated rotational position θ̂ (n)(=θ̂ (n−1)+ Δθ) obtained by the position correcting portion 74 (step S17).

If, on the other hand, the speed V of the vehicle detected by the vehicle speed sensor 6 is not zero (i.e., NO in step S3), i.e., if the vehicle is moving, the selecting portion 44 then determines whether the rotation speed ω is equal to or less than the first threshold value $ω_{TL}$, i.e., whether the rotation speed ω is a value in the low speed region (step S18). If the rotation speed ω exceeds the first threshold value $ω_{TL}$ (i.e., NO in step S18), i.e., if the rotation speed ω is a value in the medium or high region, the selecting portion 44 selects the high speed estimated rotational position θ̂$_H$ as the estimated rotational position θ̂ (n) for the current cycle (step S19). Then the process proceeds on to step 14. If, on the other hand, the rotation speed ω is equal to or less than the first threshold value $ω_{TL}$ (i.e., YES in step S18), i.e., if the rotation speed ω is a value in the low speed region, this control cycle directly ends without the selecting portion 44 selecting any of the estimated rotational positions.

Figure 10:
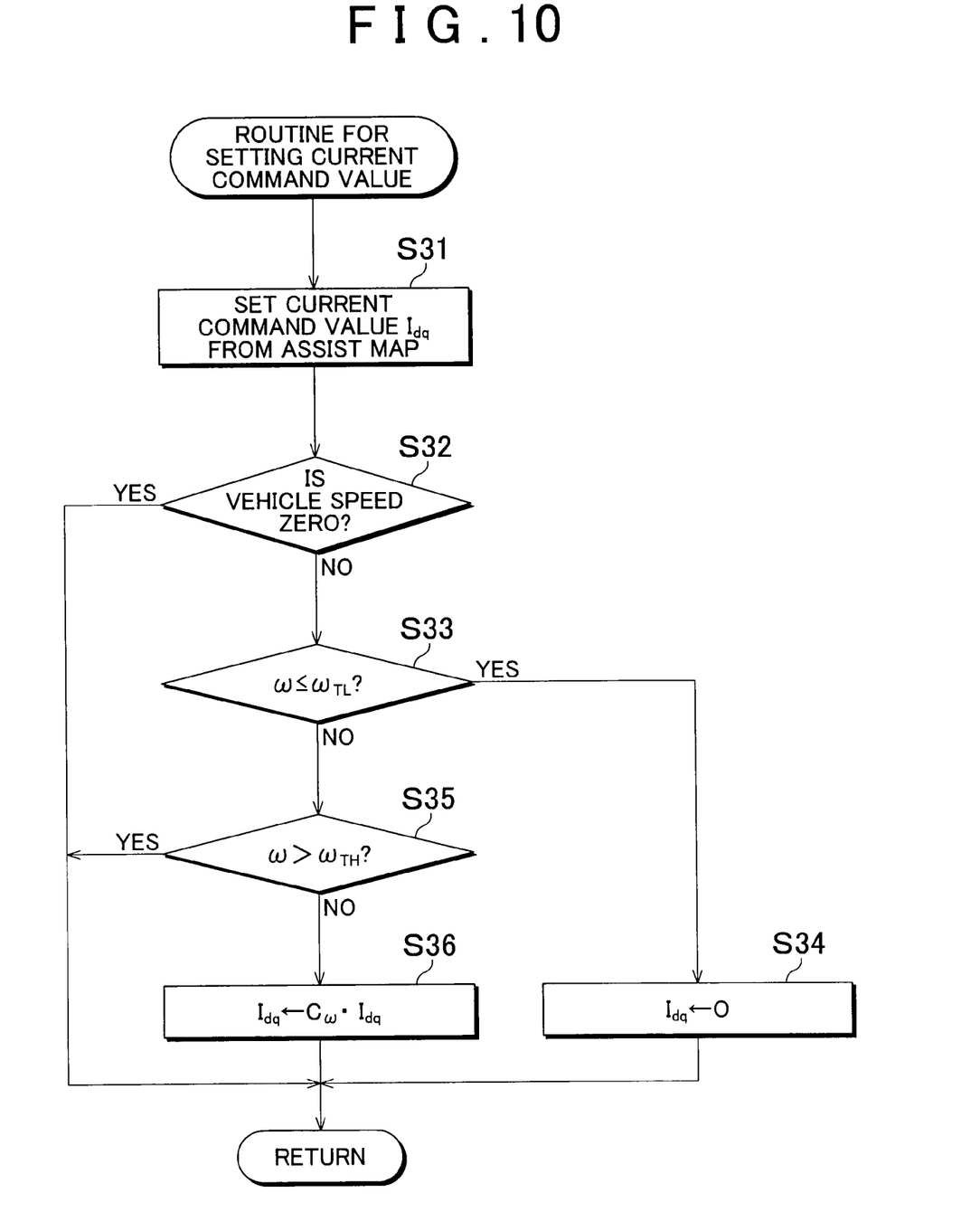
FIG. 10 is a flowchart of a routine for setting a current command value according to the vehicle speed and the rotor rotation speed.

FIG. 10 is a flowchart illustrating a routine for setting the current command value $I_{dq}$ based on the speed V of the vehicle and the rotor rotation speed ω. The current command value generating portion 11 sets the current command value $I_{dq}$ based on the steering torque detected by the torque sensor 1 and the vehicle speed V detected by the vehicle speed sensor 6, according to a predetermined assist map (step S31). The current command value generating portion 11 then determines whether the vehicle speed V is zero (step S32). If the vehicle speed V is zero (i.e., YES in step S32), the current command value $I_{dq}$ obtained in step S1 is used as it is. If the vehicle speed V is not zero (i.e., NO in step S32), the current command value generating portion 11 then determines whether the rotation speed ω is equal to or less than the first threshold value $ω_{TL}$, i.e., whether the rotation speed ω is a value in the low speed region (step S33). If the vehicle speed V is not zero and the rotation speed ω is a value in the low speed region (i.e., YES in step S33), the current command value generating portion 11 sets the current command value $I_{dq}$ to zero (step S34). That is, the motor 3 is not driven.

On the other hand, if the vehicle speed V is not zero and the rotation speed ω exceeds the first threshold value $ω_{TL}$ (i.e., NO in step S33), i.e., if the rotation speed ω is in the medium or high speed region, the current command value generating portion 11 then determines whether the rotation speed ω exceeds the second threshold value $ω_{TH}$ (step S35). If the determination is YES, i.e., if the rotation speed ω is in the high speed region, the current command value $I_{dq}$ obtained in step S1 is used as it is. If, on the other hand, the determination in step S35 is NO and it is determined that the rotation speed ω is a value in the medium speed region, the current command value $I_{dq}$ obtained in step S1 is corrected by being multiplied by a predetermined correction coefficient Cω (0<Cω≦1) (step S36). This correction coefficient Cω is set to become smaller as the rotation speed ω decreases. Therefore, in the medium speed region, the current command value $I_{dq}$ becomes smaller as the rotation speed ω decreases.

In this way, according to this example embodiment, the rotation speed ω of the rotor is obtained using a signal output from the steering sensor 4, and one of the low speed estimated rotational position θ̂$_L$, the high speed estimated rotational position θ̂$_H$, or the divided estimated rotational position θ̂$_M$ is selected based on that obtained rotor rotation speed ω. Also, the dividing coefficient α for obtaining the divided estimated rotational position θ̂$_M$ is determined based on the rotation speed ω. Therefore, even if there is error in the estimated rotational position θ̂, an appropriate estimated value can be selected and an appropriate dividing process can be performed, based on the rotation speed ω which is not affected by that error. As a result, the rotor position can be estimated more accurately.

Also, when the vehicle is stopped, the motor 3 is controlled by actively using the estimated rotational position θ̂. On the other hand, when the vehicle is moving and the rotor rotation speed ω is on the low speed side, motor control using the estimated rotational position θ̂ is suppressed because the accuracy with which the position is estimated is not very good when the rotor rotation speed ω is on the low speed side. As a result, when the vehicle is stopped, steering assist can be performed appropriately by driving the motor 3, and when the vehicle is moving, an odd steering sensation can be reduced, thereby improving the steering feel.

Figure 11:
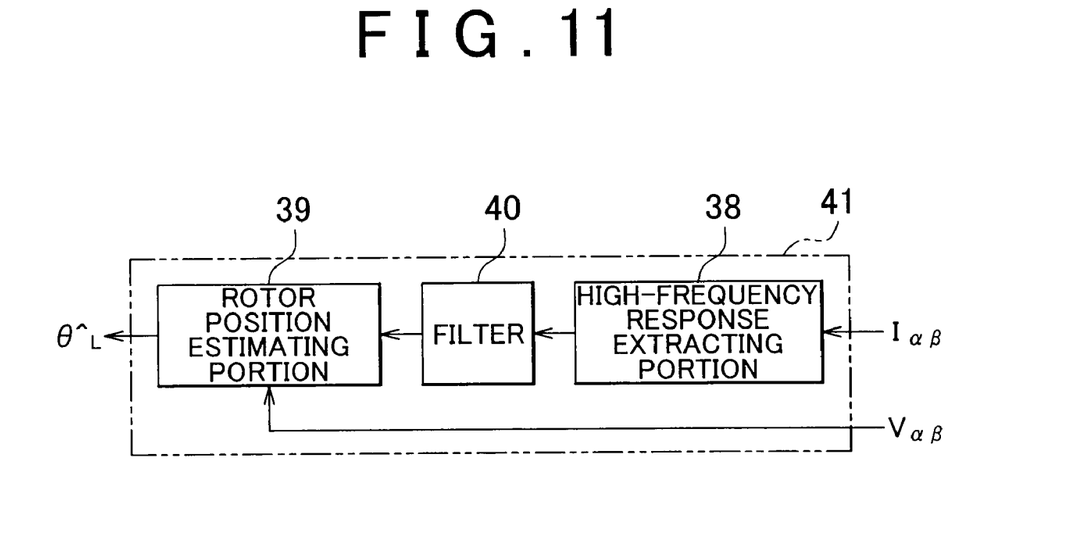
FIG. 11 is a block diagram of another example structure of a low speed region position estimating portion.

While an example embodiment of the invention is described above, other example embodiments of the invention are also possible. For example, the structure of the low speed region position estimating portion 41 may also be as shown in FIG. 11. In this example, the signal output from the high-frequency response extracting portion 38 is further filtered by a filter 40 before it is received by the rotor position estimating portion 39. The filter 40 is a filter that has a passband of around twice the high-frequency voltage applied by the high-frequency voltage generating portion 23. As can be understood from FIG. 3 described above, the response current waveform with respect to the high-frequency rotation voltage has peaks corresponding to the N and S poles of the rotor so the waveform has a frequency almost twice that of the high-frequency rotation voltage. Therefore, a signal of the necessary frequency can be amplified and detected by applying a filter in which the gain is increased for a frequency that is twice the frequency of the high-frequency rotation voltage.

Also, in the foregoing example embodiment, the calculation of the estimated rotational position θ̂ and the setting of the current control value $I_{dq}$ are different when the vehicle is stopped compared with when the vehicle is moving. Alternatively, however, the calculation of the estimated rotational position θ and the setting of the current control value $I_{dq}$ may be the same regardless of whether the vehicle is stopped or moving. More specifically, steps S3, S18, and S19 in FIG. 9 and steps S32 to S36 in FIG. 10 may be omitted.

Furthermore, in the example embodiment described above, in the medium speed region, the estimated rotational position θ̂ is obtained by internally dividing the low speed estimated rotational position θ̂$_L$ and the high speed estimated rotational position θ̂$_H$. Alternatively, however, either the low speed estimated rotational position θ̂$_L$ or the high speed estimated rotational position θ̂$_H$ may be selected by the selecting portion 44 without performing this kind of internal division. Also, the probe high-frequency voltage is superimposed on the three-phase command voltage $V_{UVW}$ in the foregoing example embodiment. Alternatively, however, the probe high-frequency voltage may be superimposed on the command voltage $V_{\gamma\delta}$ generated by the command voltage generating portion 13.

Also, in the structure shown in FIG. 4 described above, the rotation speed estimating portion 22 obtains the estimated rotation speed $\hat{\omega}$ using the estimated rotational position $\hat{\theta}$ generated by the position estimating portion 21. Alternatively, however, the rotation speed estimating portion 22 may obtain the estimated rotation speed $\hat{\omega}$ using the high speed estimated rotational position $\hat{\theta}_H$ generated by the high speed region position estimating portion 42. In this case, the correction of the estimated rotational position $\hat{\theta}$ by the position correcting portion 74 may be limited to when the rotor is rotating in the medium or high speed region. A difference (i.e., displacement) between the estimated rotational position $\hat{\theta}$ and the actual rotational position of the rotor tends to occur when there is a sudden change in speed or during high speed rotation so the estimated rotational position $\hat{\theta}$ can be effectively corrected and torque pulsation due to that displacement effectively minimized with the foregoing structure as well.

Moreover, the rotor rotation speed w can be obtained using the steering angle detected by the steering sensor 4 so the rotor rotational position θ can also be obtained using this rotor rotation speed ω. More specifically, the initial position of the rotor can be detected and the rotational position θ of the rotor obtained based on this initial position of the rotor and the rotor rotation speed ω. The initial position of the rotor can be detected by mounting a Hall sensor in a position where output can be obtained near the center or neutral position of the steering wheel 10, for example. One reason for mounting the Hall sensor near the center or neutral position of the steering wheel 10 is that it enables the output signal from the Hall sensor to be stably received. Another reason is that it enables the initial position of the rotor to be obtained quickly because the steering wheel 10 is often in the center position when the ignition switch of the vehicle is turned on. Once the initial position of the rotor is obtained, the rotational position θ of the rotor can be obtained by adding the product ω×T of the rotor rotation speed ω multiplied by the control cycle T to the initial position of the rotor. After the next control cycle, the rotor rotational position θ (n)=θ (n−1)+ω (n)×T may be obtained by adding the product ω (n)×T of the cycle time T multiplied by the rotor rotation speed ω (n) obtained in the control cycle n to the rotor rotational position θ (n−1) of the last (i.e., most recent) control cycle. For example, with a structure in which a position sensor (such as a resolver or a plurality of Hall sensors) that detects the rotational position of the rotor is provided, the rotor rotational position θ can be obtained using the output from the steering sensor 4 in the event that this position sensor fails. Then control of the brushless motor can be continued using the rotor rotational position θ obtained in this way. In the extremely low speed region where the rotation position θ of the rotor is unable to be obtained from the output of the steering sensor 4, assist control may be performed by rotating the motor 3 at a constant speed according to the output signal from the torque sensor 1.

Also, the output of the torque sensor 1 may be used instead of the output of the steering sensor 4 to obtain the rotor rotation speed ω. The torque sensor 1, for example, detects an angular difference between an input shaft side rotation angle $\Theta_i$ and an output shaft side rotation angle $\Theta_o$ of a torsion bar interposed in the steering shaft 10A. The steering torque Th is expressed as Th=k ($\Theta_i - \Theta_o$) by the torsion bar spring constant k. When this is temporally differentiated, it becomes Th'/k+ $\Omega_o = \Omega_i$ (where $\Omega_i$ is the input shaft side rotation speed and $\Omega_o$ is the output shaft side rotation speed. Therefore, the rotation speed $\Omega_i$ of the steering shaft 10A can be obtained from the rate of change in (or change in acceleration) of the steering torque Th detected by the torque sensor 1, and this rotation speed $\Omega_i$ can be converted into the rotor rotation speed ω.

Similar to when using the output signal of the steering sensor 4, the rotor rotational position θ can also be calculated using the rotor rotation speed ω obtained based on the output of the torque sensor 1. In this case, the initial position of the rotor can be detected by, for example, applying a high-frequency signal from the high-frequency voltage generating portion 23 when there is no steering torque, and checking the current response at that time. The initial position of the rotor may be detected periodically when there has been no detected signal from the torque sensor 1 for a fixed period of time or longer, for example, and the median value from among the values obtained over a plurality of times may be determined to be the initial position of the rotor.

Moreover, in the example embodiment described above, the invention is applied to control the motor 3 which serves as the driving source for the electric power steering system. However, the invention may also be applied to control of a motor for an electric pump type hydraulic power steering system or motor control used for a purpose other than a power steering system. Furthermore, various design changes within the scope of the appended claims for patent are also possible.

What is claimed is:

1. A motor controller that controls a motor provided with a rotor and a stator opposing the rotor, comprising:
    a rotation speed detecting portion that detects the rotation speed of the rotor or a member that rotates together with the rotor;
    a low speed region position estimating portion which is designed to be suitable for a predetermined low speed region and estimates the rotational position of the rotor;
    a high speed region position estimating portion which is designed to be suitable for a predetermined high speed region and estimates the rotational position of the rotor; and
    a rotational position calculating portion which obtains the rotational position of the rotor based on i) the rotation speed detected by the rotation speed detecting portion and without reference to an estimated rotational position of the rotor estimated by either of the low speed region position estimating portion and the high speed region position estimating portion, ii) the rotational position of the rotor estimated by the low speed region position estimating portion, and iii) the rotational position of the rotor estimated by the high speed region position estimating portion.

2. The motor controller according to claim 1, wherein the rotational position calculating portion includes a selecting portion that selects, according to the detected rotation speed, one of i) the rotational position of the rotor estimated by the low speed region position estimating portion or ii) the rotational position of the rotor estimated by the high speed region position estimating portion.

3. The motor controller according to claim 2, further comprising:
    a rotation speed estimating portion that estimates the rotation speed of the rotor based on i) the rotational position of the rotor calculated by the rotational position calculating portion or ii) the rotational position of the rotor estimated by the high speed region position estimating portion;
    a comparing portion that compares a rotation speed difference between the estimated rotation speed and the detected rotation speed with a speed difference threshold value; and a position correcting portion that corrects the rotational position obtained by the rotational position calculating portion, based on the detected rotation speed when the rotation speed difference is larger than the speed difference threshold value.

4. A vehicular steering system that transmits torque generated by a motor to a steering mechanism, comprising:
   a steering sensor that detects a steering angle;
   a vehicle speed sensor that detects a speed of a vehicle; and
   the motor controller according to claim 1 that controls the motor,
   wherein the rotation speed detecting portion obtains the rotation speed using the detected steering angle; and the rotational position calculating portion obtains the rotational position of the rotor based on i) the detected speed of the vehicle, ii) the detected rotation speed, iii) the rotational position of the rotor estimated by the low speed region position estimating portion, and iv) the rotational position of the rotor estimated by the high speed region position estimating portion.

5. The vehicular steering system according to claim 4, wherein the rotational position calculating portion obtains the rotational position of the rotor using the rotational position of the rotor estimated by the low speed region position estimating portion when the detected rotation speed is in a low speed region which includes values equal to or less than a first threshold value; the rotational position calculating portion obtains the rotational position of the rotor using both the rotational position of the rotor estimated by the low speed region position estimating portion and the rotational position of the rotor estimated by the high speed region position estimating portion when the detected rotation speed is in a medium speed region which includes values greater than the first threshold value and equal to or less than a second threshold value which is greater than the first threshold value; and the rotational position calculating portion obtains the rotational position of the rotor using the rotational position of the rotor estimated by the high speed region position estimating portion when the detected rotation speed is in the high speed region which includes values greater than the second threshold value.

6. The vehicular steering system according to claim 5, further comprising:
   a rotation speed estimating portion that estimates the rotation speed of the rotor based on the obtained rotational position of the rotor;
   a comparing portion that compares a rotation speed difference between the estimated rotation speed and the detected rotation speed with a speed difference threshold value; and
   a position correcting portion that corrects the obtained rotational position based on the detected rotation speed when the rotation speed difference is larger than the speed difference threshold value.

7. The vehicular steering system according to claim 5, wherein the rotational position calculating portion obtains the rotational position of the rotor according to the function in claim 5 when the detected speed of the vehicle is zero.

8. The vehicular steering system according to claim 7, wherein when the detected rotation speed is in the medium speed region, the rotational position calculating portion increases the utilization rate of the rotational position of the rotor estimated by the high speed region position estimating portion as the rotation speed of the rotor increases.

9. The vehicular steering system according to claim 5, further comprising:
   a current command value generating portion that sets a current command value for driving the motor based on the detected speed of the vehicle and the detected rotation speed, wherein the current command value generating portion sets the current command value to zero to stop driving the motor when the detected speed of the vehicle is not zero and the detected rotation speed is in the low speed region, and the rotational position calculating portion obtains the rotational position of the rotor using the rotational position of the rotor estimated by the high speed region position estimating portion when the detected speed of the vehicle is not zero and the detected rotation speed is in the medium speed region or in the high speed region.

10. The vehicular steering system according to claim 9, further comprising:
    a rotation speed estimating portion that estimates the rotation speed of the rotor based on the obtained rotational position of the rotor;
    a comparing portion that compares a rotation speed difference between the estimated rotation speed and the detected rotation speed with a speed difference threshold value; and
    a position correcting portion that corrects the obtained rotational position based on the detected rotation speed when the rotation speed difference is larger than the speed difference threshold value.

11. The vehicle steering system according to claim 9, wherein the current command value generating portion reduces the current command value as the rotation speed decreases when the detected speed of the vehicle is not zero, and the detected rotation speed is in the medium speed region.

* * * * *